United States Patent [19]

Notaras et al.

[11] Patent Number: 4,482,831
[45] Date of Patent: Nov. 13, 1984

[54] MAGNETO ARRANGEMENT

[76] Inventors: John A. Notaras; Angelo L. Notaras, both of 15 Reynolds St., Balmain, New South Wales, 2041, Australia

[21] Appl. No.: 479,951

[22] Filed: Mar. 29, 1983

[30] Foreign Application Priority Data

Apr. 5, 1982 [AU] Australia ............... PF3484

[51] Int. Cl.³ .......................................... H02K 21/12
[52] U.S. Cl. ..................................... 310/156; 310/74; 310/153; 123/149 R
[58] Field of Search ............... 310/74, 70 A, 153, 156, 310/42, 168; 74/572; 123/149 R, 149 D; 324/146; 29/598, 607

[56] References Cited

U.S. PATENT DOCUMENTS

| 1,916,700 | 7/1933 | Walther | 310/153 |
| 2,060,259 | 11/1936 | Spengler | 310/156 |
| 2,756,356 | 7/1956 | Brownlee | 310/156 |
| 2,985,779 | 5/1961 | Flaningam | 310/153 |
| 3,828,426 | 8/1974 | Phelon | 310/42 |
| 4,179,634 | 12/1979 | Burson | 310/156 |
| 4,404,513 | 9/1983 | Campen | 310/153 |

FOREIGN PATENT DOCUMENTS

| 189852 | 5/1957 | Austria | 310/153 |
| 2062486 | 7/1972 | Fed. Rep. of Germany | 310/156 |

Primary Examiner—R. Skudy
Attorney, Agent, or Firm—Ladas & Parry

[57] ABSTRACT

A magneto rotor assembly is disclosed in which a magnet is clamped in position between a pair of pole pieces within a cavity in a rotor. The pole pieces are provided with at least one tapered surface which engages a or the corresponding tapered surface(s) of the rotor cavity to prevent movement of the pole pieces and magnet. A fastener is also provided to hold each pole piece in engagement with the rotor cavity.

7 Claims, 10 Drawing Figures

MAGNETO ARRANGEMENT

The present invention relates to magnetos for internal combustion engines and, in particular, to the assembly of the magnet and pole pieces within the rotor of a magneto.

It is known from U.S. Pat. No. 4,179,634, for example, to assemble a ceramic magnet between two sintered pole pieces and retain the pole pieces held within a cast rotor by means of split dowels.

This arrangement has the very great advantage of ease of assembly thereby reducing the manufactured cost of the rotor and magneto assembly, however, this arrangement suffers from the disadvantage that the split dowels are inclined to deform under inertial loads at high rotor speeds thereby causing the pole pieces to move slightly radially outwardly at high speed.

This disadvantage can be catered for in the design of the internal combustion engine, however, the resulting machine must have a relatively large air gap in order to cater for the expected movement of the pole pieces at high speed. In consequence, the magnetic and electrical performance of the magneto is reduced at low speeds owing to the increased reluctance of the magneto magnetic circuit brought about by the relatively large air gap.

It is the object of the present invention to provide an improved magneto construction which overcomes, or substantially ameliorates, the abovementioned disadvantage.

According to one aspect of the present invention there is disclosed a magneto rotor assembly in which a magnet is maintained in position between a pair of pole pieces within a cavity in said rotor, wherein said pole pieces are provided with at least one tapered surface and said cavity has at least one tapered surface corresponding to each pole piece, said pole piece and rotor cavity tapered surfaces being mutually engagable to clamp said pole pieces against said magnet within said rotor wherein a fastener holds each pole piece in engagement with said rotor and wherein the direction of clamping of said tapered surfaces is substantially perpendicular to the longitudinal axis of said fastener.

Four embodiments of the present invention will now be described with reference to the drawings in which:

FIG. 1 is a schematic plan view of the prior art arrangement of U.S. Pat. No. 4,179,634;

Figure 1:
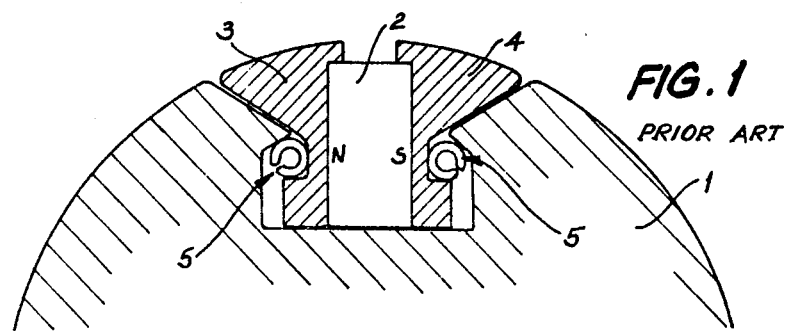
Figure 2:
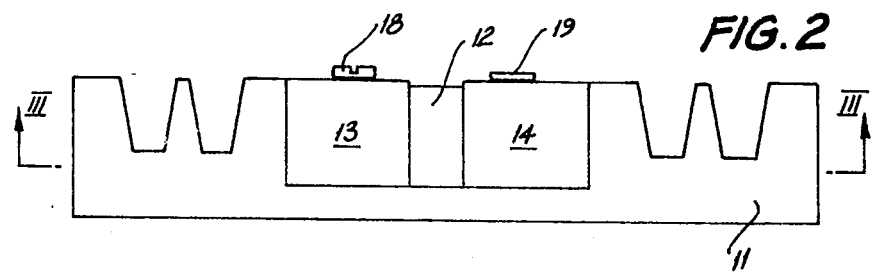
FIG. 2 is a side elevation of the rotor having the magneto construction of a first preferred embodiment.

FIG. 1 illustrates the magneto construction used in four stroke motors in which a cast aluminium fly wheel 1 has mounted therein a ceramic magnet 2 which is retained between two sintered pole pieces 3 and 4. The pole pieces 3 and 4 are each respectively held in position by a split dowel 5 which is forced between the pole piece 3, 4 and the fly wheel 1.

The split dowel 5 comprises a hollow metal tube with a longitudinally extending slot therein which is capable of resilient deformation so as to reduce the diameter of the dowel 5. It will be apparent that the resilience of the dowel 5 holds the pole pieces 3, 4 against the magnet 2 and also prevents both sideways (that is, along a cord) movement of the pole pieces and radial movement of the pole pieces. The pole pieces 3,4 and magnet 2 are restrained against movement into and out of the plane of the paper by means of the frictional force present between the split dowels 5, pole pieces 3,4 and fly wheel 1.

The arrangement illustrated in FIG. 1 has many manufacturing advantages in as much as low cost components are able to be utilised and the arrangement is able to be easily assembled. However, in operation the assembly of FIG. 1 suffers from the disadvantage that at high speed the fly wheel 1 experiences an extreme, radially directed, inertial force. This force tends to compress the dowels 5 and thereby allow the pole pieces 3,4 to move radially outward. In consequence, the air gap of the machine must be larger than would otherwise be the case if the pole pieces 3,4 where absolutely fixed. Thus, the electrical performance of the magneto incorporated in the structure of FIG. 1 is degraded, especially at low speed.

In accordance with the preferred embodiment of the present invention, the abovementioned disadvantage is overcome by securely holding the pole pieces in three mutually perpendicular directions.

Figure 3:
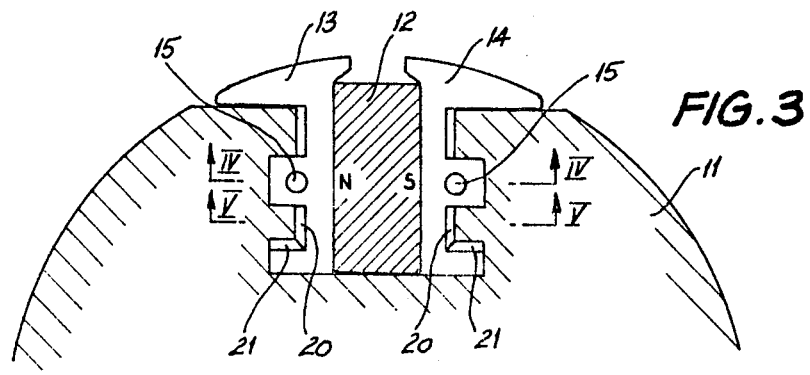
FIG. 3 is a cross sectional view taken along line III—III of FIG. 2.
Figure 4:
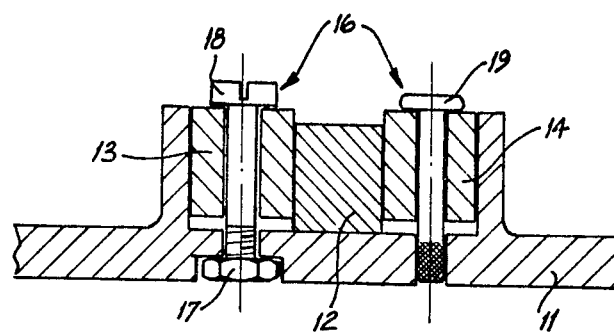
FIG. 4 is a cross sectional view taken along the line IV—IV of FIG. 3.

As illustrated in FIGS. 2–5 inclusive, in accordance with the preferred embodiment, the fly wheel 11 receives a ceramic magnet 12 held between sintered pole pieces 3, 4, generally as before. However, the pole pieces 13, 14 are each provided with an aperture 15 through which the shank of a fastener 16 extends. As best seen in FIG. 4, the fastener 16 can be either a nut 17 and bolt 18 or a knurled rivet 19.

Figure 5:
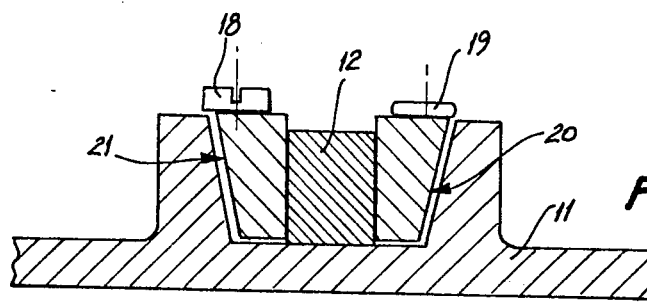
FIG. 5 is a further cross sectional view taken along the line V—V of FIG. 3.

In addition, as best seen in FIGS. 3 and 5, the pole pieces 13, 14 are provided with two tapered surfaces 20 and 21 the normals of which are substantially "mutually perpendicular". Preferably the degree of taper is relatively slight, preferably of the order of approximately 5 degrees, thus the normal to the "notional surface" which is tapered at, say, 5 degrees in order to produce the actual tapered surface, is mutually perpendicular to the normal passing through the other notional surface and also substantially perpendicular to the longitudinal axis of the fastener 16.

It will be apparent from FIG. 3 that the tapered surface 20 which extends in the radial direction holds the pole pieces 13, 14 against outward movement away from the magnet 12 along the "chord" which forms the line joining apertures 15. Similarly, the tapered surface 21 holds the pole pieces 13, 14 against radial movement during rotation of the fly wheel 11. Each of the pole pieces 13, 14 includes a substantially flat portion (not identified in the drawings).

Figure 6:
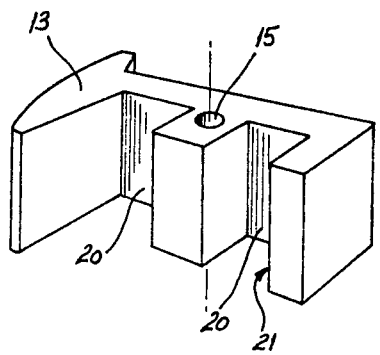
FIG. 6 is a perspective view of one of the pole pieces of FIGS. 2 and 3.

It will be appreciated in considering FIG. 6 that since the degree of taper of the tapered surfaces 20, 21 is normally very slight, the taper is not very apparent in FIG. 6.

It will be apparent that during assembly each of the pole pieces 13 and 14 is located within the rotor 11, then the magnet 12 is positioned between the pole pieces 13, 14 which are raised as seen in FIG. 5 or moved away from the rotor 11.

Then the fasteners 16 are secured forcing the pole pieces 13, 14 towards the rotor 11 and clamping the magnet 12 in place to ensure both a low reluctance magnetic path and that the magnet 12 and pole pieces 13, 14 are secured. Naturally the apertures 15 are of slightly larger diameter than the shanks of the fasteners 16 to permit this clamping action.

Figure 7:
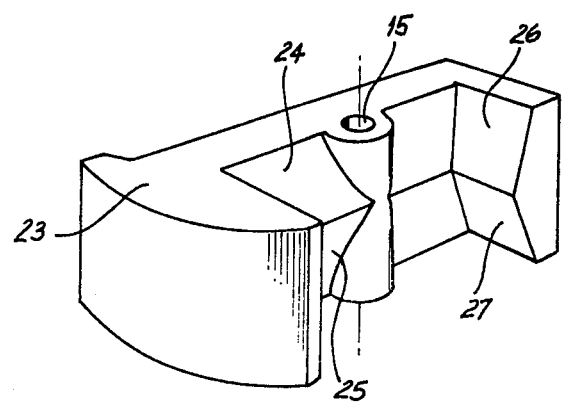
FIG. 7 is a view similar to FIG. 6 but of a pole piece of a second embodiment.
Figure 8:
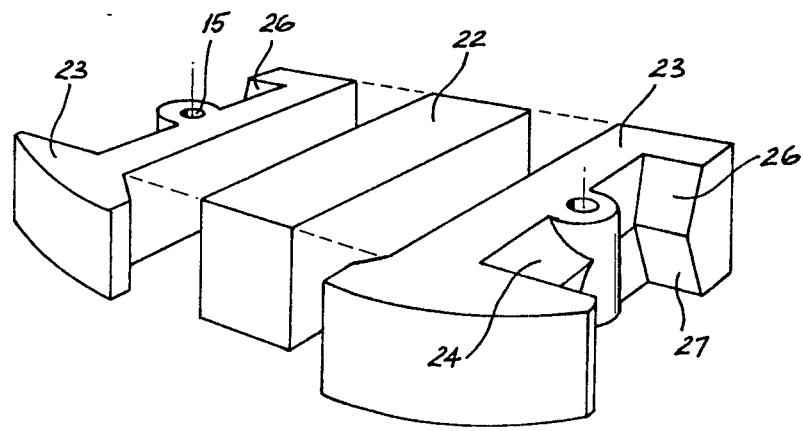
FIG. 8 is an exploded perspective view of two pole pieces and a magnet in accordance with the embodiment of FIG. 7.

FIGS. 7 and 8 illustrate a second embodiment of the present invention in which a single pole piece 23 can be utilized to either side of a magnet 22 by merely reversing the pole piece 23. This facility is bought about because the pole piece 23 is doubly tapered having radial surfaces 24 and 25 which abut each other and taper in opposite directions and also having chord surfaces 26, 27 which abut each other and which also taper in opposite directions. Again, the pole pieces 23 is provided with an aperture 15 through which a fastener (not illustrated) is able to pass, the fastener being "perpendicular" to the "normal" passing through the radial surfaces 24,25 and also "perpendicular" to the "normal" passing through the chord surfaces 26, 27. The arrangement of FIGS. 7 and 8 reduces the number of different parts required for the assembly. The tapered surfaces 24, 25 can be made substantially equal, and the pole pieces 23 are substantially identical.

Figure 9:
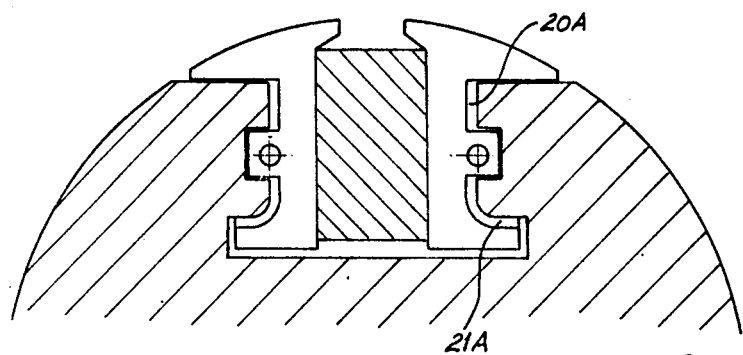
FIG. 9 is a view similar to FIG. 3 but of a third embodiment.
Figure 10:
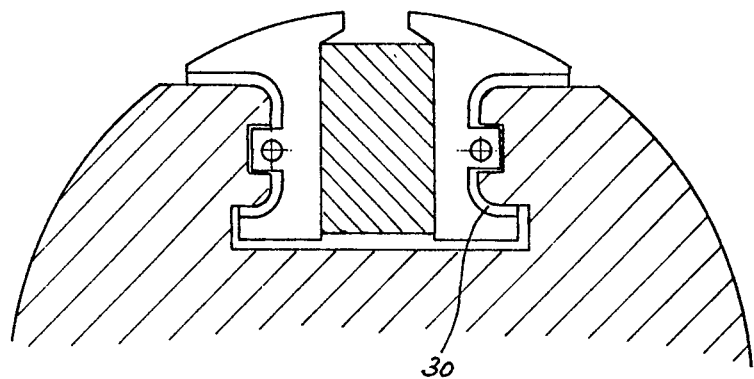
FIG. 10 is a view similar to FIG. 9 but of a fourth embodiment.

FIG. 9 illustrates a third embodiment, in a manner similar to FIG. 3. The tapered surface 20A which extends in the radial direction is as before but smoothly transforms to become curved chord tapered surface 21A which extends in the chord direction. In the fourth embodiment illustrated in FIG. 10 the radial and chord direction tapered surfaces are merged into a quasi-semi-circular tapered surface 30. In these two latter embodiments the tapered surfaces of the rotor have to be correspondingly shaped. The reversible dual taper pole piece of FIGS. 7 and 8 is also applicable to the curved tapered surfaces of the pole pieces of FIGS. 9 and 10.

The foregoing describes only four embodiments of the present invention and modifications, obvious to those skilled in the art, may be made thereto without departing from the scope of the present invention. For example, the aperture 15 can take the form of an open sided slot.

What we claim is:

1. A magneto rotor assembly in which a magnet is maintained in position between a pair of pole pieces within a cavity in said rotor, said pole pieces are provided with two tapered surfaces and said cavity is provided with two corresponding tapered surfaces, one of said tapered surfaces extending in a radial direction to hold said pole pieces against outward movement away from said magnet and the other of said tapered surfaces holding said pole pieces against radial movement each said pole piece and said rotor cavity tapered surfaces being mutually engagable to clamp said pole pieces against said magnet within said rotor wherein a fastener holds each pole piece in engagement with said rotor said two tapered surfaces having normals which are substantially mutually perpendicular and lie approximately in a plane and which is substantially perpendicular to the longitudinal axis of said fastener.

2. A magneto rotor assembly as claimed in claim 1 wherein each said pole comprises a first portion which is substantially flat and a second portion which is generally curved.

3. A magneto rotor assembly as claimed in claim 1 wherein each of said pole pieces has a single tapered surface which is curved to form a quasi-semi-circular tapered surface.

4. A magneto rotor assembly as claimed in claim 1 wherein said tapered surfaces of each of said pole pieces are tapered in two substantially opposite directions.

5. A magneto rotor assembly as claimed in claim 4 wherein said opposite tapered surfaces are substantially equal and both said pole pieces are substantially identical.

6. A magneto rotor assembly as claimed in claim 1 wherein said tapered surfaces have a taper of approximately 5 degrees.

7. A magneto rotor assembly as claimed in claim 1 wherein each said fastener has a shank passing through an aperture in the corresponding pole piece, the size of said aperture being greater than the width of said shank.

* * * * *